United States Patent
Howes

[11] 3,890,124
[45] June 17, 1975

[54] COMBINATION GREASE CENTRIFUGAL SEPARATOR AND FLAME TRAP

[76] Inventor: Leslie D. Howes, 742 W. El Camino Dr., Phoenix, Ariz. 85021

[22] Filed: July 22, 1974

[21] Appl. No.: 490,381

[52] U.S. Cl. .................. 55/346; 55/440; 55/449; 55/462; 55/DIG. 36; 98/115 K
[51] Int. Cl. ............................................ B01d 45/12
[58] Field of Search ............ 55/346, 349, 440–446, 55/447–449, 459, 462, DIG. 36; 98/115 K

[56] References Cited
UNITED STATES PATENTS

| | | |
|---|---|---|
| 2,191,187 | 2/1940 | Bingman .............................. 55/349 |
| 2,848,061 | 8/1958 | Allander et al. ...................... 55/349 |
| 3,393,497 | 7/1968 | Donnelly ........................ 55/DIG. 36 |
| 3,566,585 | 3/1971 | Voloshen et al. ..................... 55/443 |

Primary Examiner—Bernard Nozick
Attorney, Agent, or Firm—Warren F. B. Lindsley

[57] ABSTRACT

A combination grease centrifugal separator and flame trap removably mounted in the exhaust hood of a cooking range which extracts grease and other foreign particles from the cooking fumes as they pass through the filter and prevents further propogation of any attendant flame at the filter.

4 Claims, 7 Drawing Figures

PATENTED JUN 17 1975

3,890,124

SHEET 1

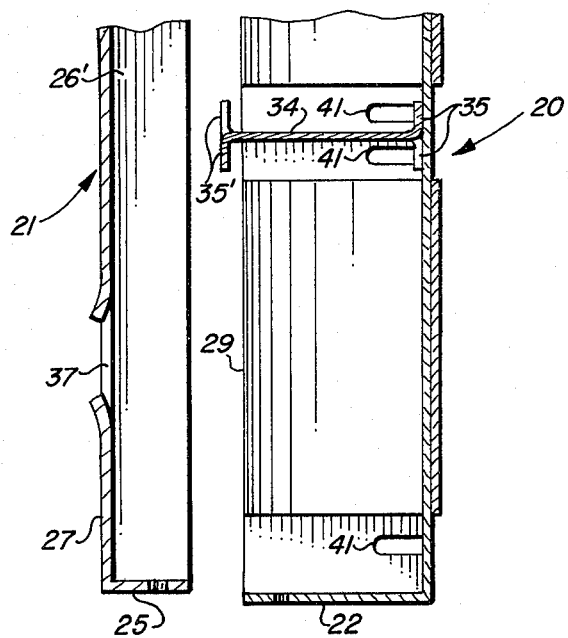
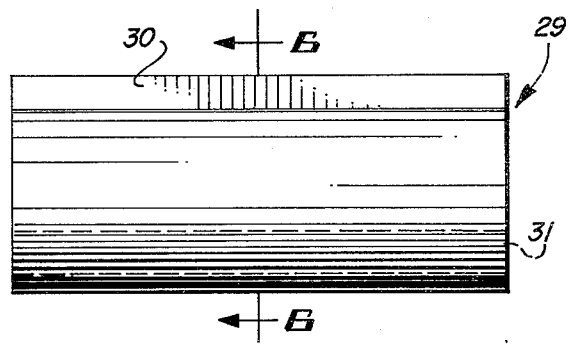
FIG.-4    FIG.-5
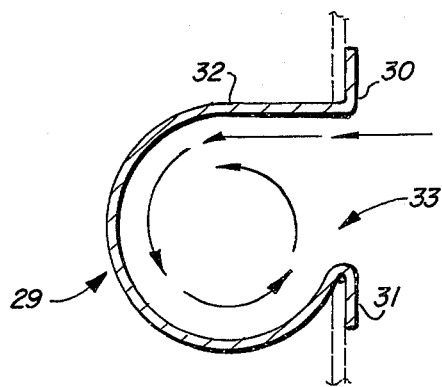
FIG.-6
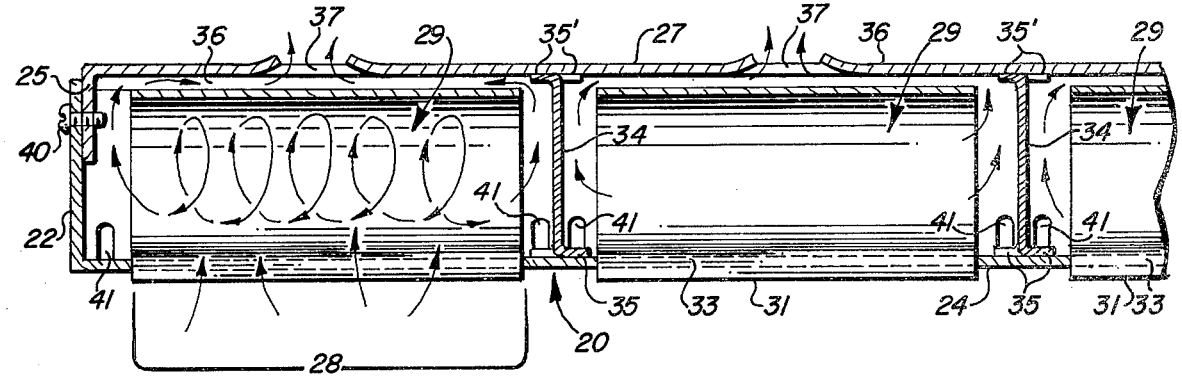
FIG.-7

3,890,124

COMBINATION GREASE CENTRIFUGAL SEPARATOR AND FLAME TRAP

BACKGROUND OF THE INVENTION

This invention relates to filters or filtering devices utilized in conjunction with a forced air ventilating system for exhausting the heavy laden fumes emitted during the cooking process from the vicinity of cooking ranges, barbeques or the like for removing large quantities of grease and other particulate from the air stream as it passes through the filter and snuffing out or extinguishing any flame that may attempt to pass through the same into the stack or exhaust duct of the system.

FIELD OF THE INVENTION AND PRIOR ART

In the commercial preparation of steak, hamburger and the like in restaurants and snack bars, the common practice has been to broil these products over burning charcoal, gas fired broilers or flat grilling surfaces. An undesirable by-product of this cooking process is the large amount of vaporized animal fat generated which are customarily vented from the area above the cooking surface through a filter of filter banks into an exhaust stack or duct from which they are discharged to the atmosphere.

Due to the large amount of animal fat or grease generated (2-4 ounces per lb.) during such cooking process and the relatively low filtration efficiency of present day filters, considerable quantities of grease and carbon particles are precipitated out on the surfaces of the collector hood and filter surfaces, thus forming a potential fire hazard. Ignition of these deposits occurs when flames impinge on the mesh material of the filters and the flame propogates to the down stream side of the filter and into the exhaust stack.

SUMMARY OF THE INVENTION

In view of the above mentioned deficiencies, a combination grease filter and flame trap has been provided comprising an all metal, box like structure adapted to be removably secured in angular relationship to the cooking surface of the range or barbeque in the hood portion of its ventilating system directly above its cooking area. The speed of travel of the grease, carbon and other particulate heavy laden fumes through the ventilating system of the cooking range is greatly amplified by the use of one or more exhaust fans (not shown) usually located in the plenum or stack of the ventilating system on the downstream side of the filter and flame trap. The inner structural components of the filter and flame trap are designed to receive the grease and other flame supporting matter in the exhaust fumes of the range and to cause the precipitation of the grease and other exhaust particles on the inner surfaces of the filter and to extinguish any flame that may propogate to the filter in its flame trap.

It is, therefore, an object of this invention to provide an improved filtering device for the exhaust systems of cooking ranges that will trap grease in the exhaust fumes from its cooking surface and drain it to a collecting trough.

Another object of this invention is to provide a filtering device employing means for increasing the residence time of burning particles within the filter for trapping and or consuming them by flame before they exit into the exhaust stack of an associated chimney.

A further object of this invention is to provide a combined filter and flame trap assembly for use in the ventilating system of cooking units that is capable of producing high gas velocities and extreme turbulence within the same for the purpose of arresting flame propogation at the filter.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 4 is a fragmentary longitudinal sectional view taken on the line 4—4 of FIG. 3 illustrating the relationship between the vortex generators, the vertically disposed separators therebetween, the vertically disposed rectangular openings in the back plate portion of the rectangular frame and the inside end surfaces of the front plate portion of the frame.

FIG. 5 is a rear elevational view of one of the vortex generators as it would appear before installation in one of the plurality of rectangular openings provided in the front face plate of the frame.

FIG. 6 is a vertical sectional view taken on line 6—6 of FIG. 5 illustrating one method of attaching the vortex generators in the rectangular openings in the front face plate of the frame.

FIG. 7 is a longitudinal fragmentary sectional view taken on the line 7—7 of FIG. 2 which is similar to FIG. 4 except for the showing of several of the vortex generators and the vertical separators in their relationship to the completely assembled box like front and rear sections of the rectangular frame and indicating by arrows the direction of air travel of the fumes through the assembled grease filter and flame trap.

DESCRIPTION OF THE PREFERRED EMBODIMENT

Figure 1:
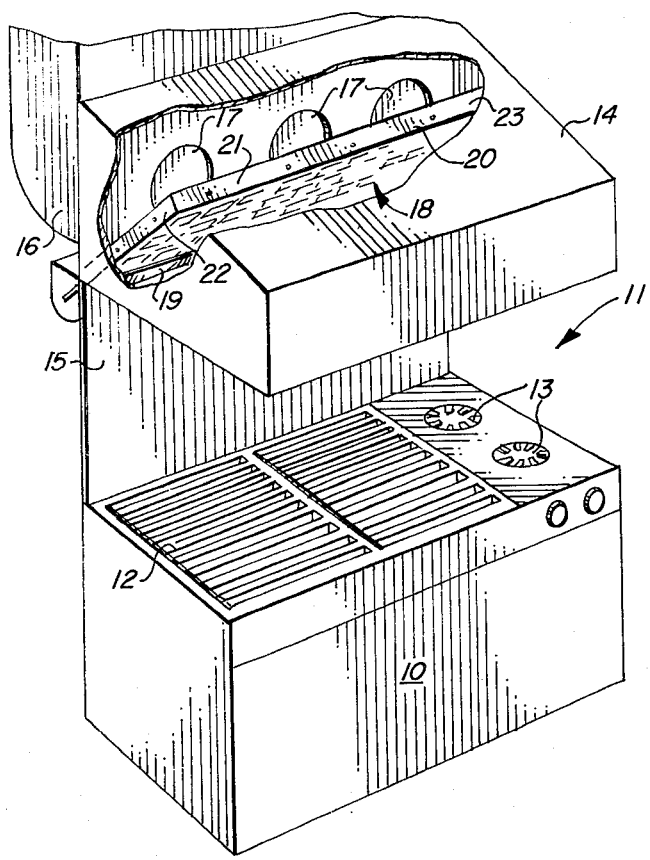
FIG. 1 is a perspective view of a typical cooking unit and ventilating system showing the combined filter and flame trap of this invention installed in the hood portion of the unit.

Referring more particularly to the drawings by characters of reference, FIG. 1 illustrates a typical cooking unit 10 and its associated ventilating system 11. The cooking unit may comprise, for example, a top surface grill 12 that may be gas fired or adapted to use charcoal for broiling and one or more open burners 13.

The ventilating system for the cooking unit 11, as shown, may comprise a collector hood 14 rigidly mounted on a vertical backing plate 15 directly above the cooking surface of the unit. The hood is intended to collect and direct the fumes emanating during the cooking process from the surface of the unit through openings 17 of hood 14 into a suitable chamber or plenum 16.

Plenum 16 is provided with the usual stack or chimney (not shown) for the passage of smoke and fumes therefrom to the atmosphere. In order to speed up the natural flow of the smoke and fumes through the ventilating system, one or more suitable exhaust fans may be installed in the plenum in direct communication with openings 17 to provide a forced air ventilating system for the cooking unit.

A combination grease baffle, filter and flame trap 18 of this invention is removably installed in the underside of hood 14 at an approximate 45° angle to the horizontal cooking surface of unit 11 with its bottom edge contacting the vertical backing plate 15. A horizontally extending angle strip 19 is secured to backing plate 15 so that its top edge contacts and rests against the underside sloping surface of the hood.

It should be understood that the terms baffle and filter are synonymous as used herein and although only one or the other of these terms are used hereinafter both are intended. Further, it should also be noted that the dimensions of the combination grease filter and flame trap 18 are variable and dependent only on the interior dimensions of the hood in which it is to be installed. The filter and flame trap 18 should cover the area of the hood leading to plenum 16 so that all the smoke and fumes arising from the cooking surfaces will be forced to pass through the filter and flame trap before they reach plenum 16 and are exhausted through the stack or chimney to the atmosphere.

The grease filter and flame trap 18 may comprise two box like sections fixed to mate, one over the other in a telescoping manner when assembled together to form a single unit having length and width dimensions according to the interior dimensions of the particular hood in which is to be installed.

The exposed front or cover section 20 of filter and flame trap 18 is slightly larger in overall dimensions than its rear box section 21 so that the cover section fits tightly but in a removable manner over the rear box section in their assembled relationship. As noted from the drawings, the front cover section 20 is somewhat deeper than the rear box section for purposes hereinafter explained.

The front or cover section 20 comprises the usual integral perimeter end walls 22 (only one end of which is shown) and side walls 23 and 23' which are integrally connected to a front face plate 24. The rear box section 21 is formed by the perimeter end walls 25 and 25' and side walls 26 and 26' which are integrally joined to a rear backing plate 27.

The front face plate 24 is provided with a plurality of spaced rectangular openings 28 that are longer than they are wide which are arranged in longitudinal parallel alignment in several vertical and parallel banks. The banks are spaced a suitable distance from end walls 22 and from each other.

Figure 3:
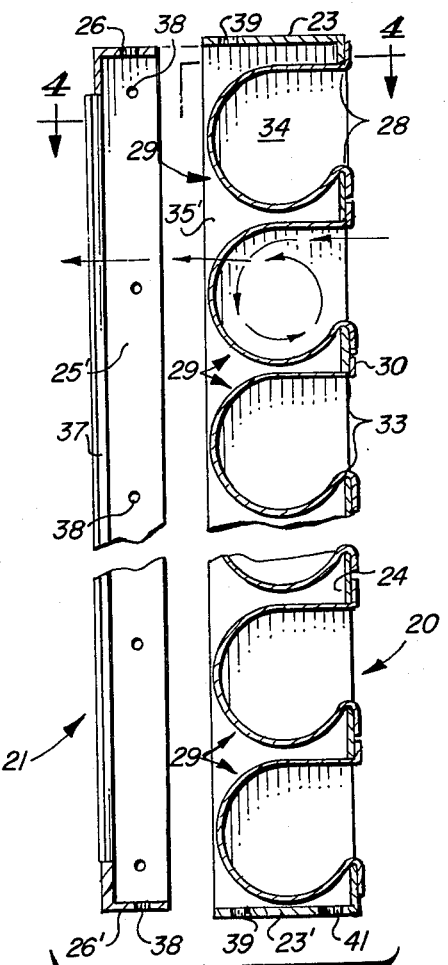
FIG. 3 is a transverse sectional view of the unassembled box like portions of the device taken along the line 3—3 of FIG. 2 showing the preferred general arrangement of its interior components which include a plurality of substantially cylindrical shaped vortex generators.
Figure 2:
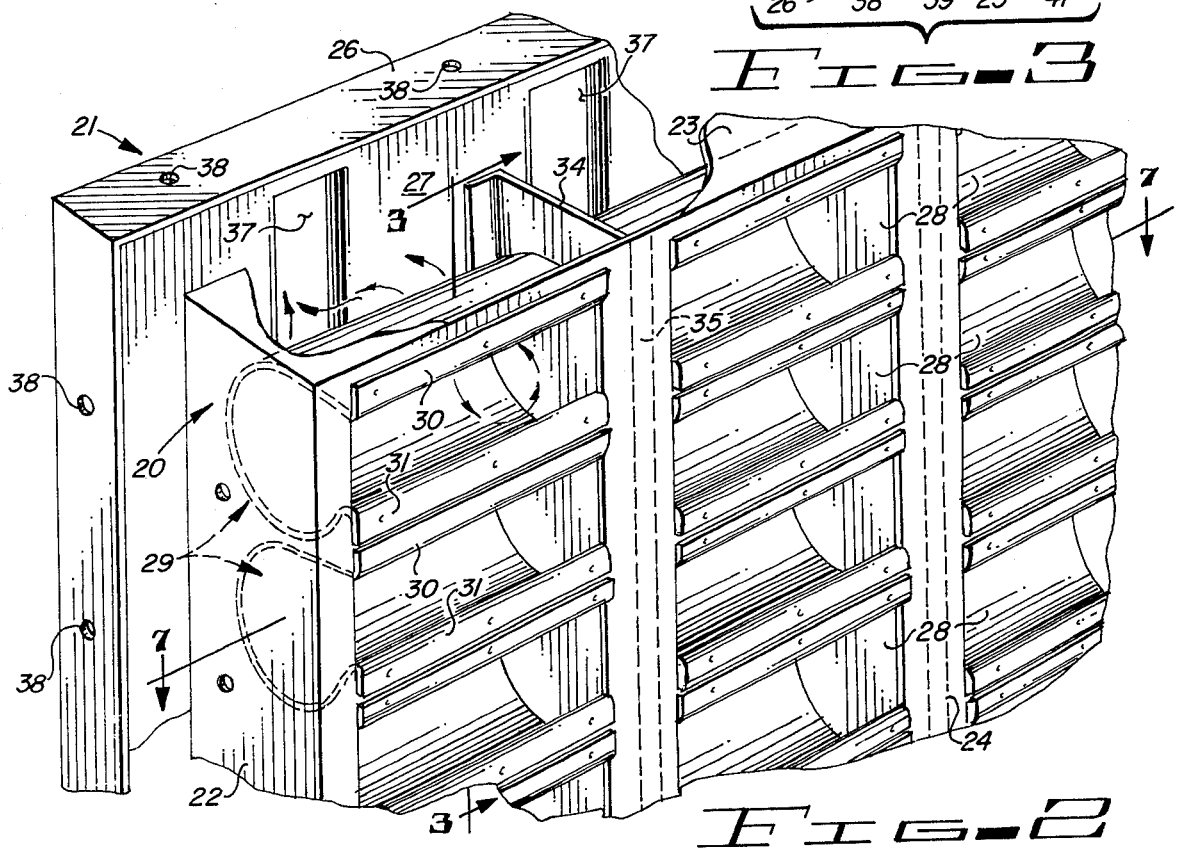
FIG. 2 is a fragmentary, partially exploded perspective view illustrating the relationship of the interior components and exterior features of the unassembled box like portions of the device.

A plurality of vortex generators 29 each provided with integral flanges 30 and 31 are installed one in each of the spaced rectangular openings 28. Flanges 30 and 31 are formed to extend over the longitudinal edges of the openings 28 so as to lie flat against the outer surface of the front face of plate 24 to which they are rigidly secured as shown in FIGS. 2 and 3 of the drawings.

All of the component parts of the grease filter and flame trap 18 of this invention are preferably fabricated of corrosion resistant, noncombustible material, such as stainless steel. The substantially cylindrical shaped vortex generators 29 are fabricated of similar material which has been heat treated or processed to provide some flexibility and spring like characteristics so that when the generators are installed in rectangular openings 28, the cylindrical body portion of the generators can be compressed sufficiently to draw their upper and lower integral flanges 30 and 31 closer together so that they may be passed through the rectangular openings 29 and then return to their normal preferred shape as shown in FIGS. 3, 5 and 6 of the drawings.

It should be noted that the body portions of the vortex generators 29 are not completely cylindrical in shape. Approximately one half of their top portions are flattened out in horizontal and parallel relationship to the perimeter side walls 23 and 23' of cover section 20 and joins the cylindrical portion of the generators at its point of tangency as indicated at 32 in FIG. 6. The rectangular openings 33 formed at the mouths of the vortex generators are only slightly less in area than that of the rectangular openings 28 formed in the front face plate 24 to thus provide the greatest possible area of access for air mixtures into the generators.

Equally spaced between the opposed ends of the vertically arranged banks of vortex generators are provided several vertically disposed separators 34. Each of these separators comprise a flat plate that extends between the inside surfaces of the perimeter side walls 23 and 23' of the front cover section 20 and are provided with suitable intermittent vertically arranged right angled flanges 35 arranged to extend perpendicularly outward from the inside surface of face plate 24 to which the contacting surfaces of the right angled flanges 35 are securely attached. These flanges project outwardly from separators 34 a greater distance than the inside depth of the front cover box section 20 so that when the rear box section 21 is installed, the same similar intermittent vertically arranged right angled flanges 35' integral with the outer edge of separators 34 will bear against the inside face of backing plate 27 and limit the inward movement of the rear box section toward the rear of the vortex generators 29. This arrangement provides an air circulation space 36 therebetween box sections 21 and 22 as shown in FIG. 7 of the drawings.

Back plate 27 may be provided with one or more vertically disposed rectangular openings 37 with one in approximate vertical alignment with the vertical centers of each bank of vortex generators.

The end and side walls 25, 25' and 26 and 26' of the rear box section 21 are provided with suitably spaced clearance holes 38 that are adapted to mate with similarly spaced clearance holes 39 in the end and side walls 22 and 23, 23' of the front cover box section 20. These holes are adapted to receive suitable sheet metal screws 40 to secure the rear and front box sections 21 and 20 in assembled but seperable spaced relationship to each other.

The lower side walls 23' of the front cover box section are provided with a plurality of suitable elongated drain holes 41 that are located adjacent the end walls 22 and adjacent to both sides of the vertically disposed separators 34 to provide for drainage of liquified grease into a suitable drain trough attached to the rear of the vertical backing plate 15 of the ventilating system in any suitable manner.

Operation or Function

When the combination grease filter and flame trap of the present invention is properly installed in the collector hood 14 of a cooking unit having a forced air ventilating system such as the cooking unit 10 shown and described, it will perform its specific functions in the following manner:

The effluent or air mixture that arises from the cooking surfaces during a cooking process saturated with grease, carbon and other entrained particulates, is drawn through the rectangular openings or mouths 33 in the vortex generators 29 by the suction effect created by the exhaust fans (not shown) suitably located in the ventilating system. As the air mixture enters the vortex generators, the flat upper surface of the substantially cylindrical body portion of the vortex generators directs the air mixture against the cylindrical inner surface of the same which causes it to assume a whirling motion in a substantially spiral path. The air mixture splits as it passes out through the two open ends of the vortex generators 29 where it impinges on the inside surfaces of the end walls 22 and 25, 25' of the box sections 20 and 21 and on the side surfaces of the vertically disposed separators 34. This action causes the air stream to change its direction of flow and impinges further on the inner surface of the rear backing plate 27 as it moves slightly upward and to the rear passing through the vertically disposed rectangular openings 37 into the chamber or plenum 16 and out through the stack to the atmosphere.

Considerable turbulence is developed by the rotational path of the effluent through the vortex generators in its circuitous path to the rear exit openings 37. The centrifugal movement of the same tends to cause the entrained particulates to be separated from the air stream and precipitated out on the inner cylindrical walls of the vortex generators 29. Additional precipitation occurs on the inside surfaces of the box sections 20 and 21 due to the abrupt directional changes imposed on effluent issuing from the open ends of the vortex generators.

Grease particles thus collected become fluid and flow downwardly on the inner inclined surfaces of the filter to the inside bottom corner of the front cover box section 20 from which it is dispensed through the drain holes 41 into a suitable drain or collector trough for disposal.

Two features are designed into the combination grease filter and flame trap of this invention for the purpose of arresting flames, namely: a high gas velocities, and extreme air turbulence.

Velocity

It has been determined that mixtures of combustible gases and air have a limiting flame propogation speed under ideal conditions.

Natural gas/air mixtures having a maximum flame speed of approximately 1 ft./sec and hydrogen/air mixtures having a maximum speed of 9.25 ft./sec. The inlet and exit velocities of the embodiment disclosed are approximately 16.9 ft./sec under standard condition of 59° F and 14.7 PSIA.

Turbulence

Designers of high intensity combustion chambers for jet engines and gas turbines use induced turbulence to achieve heat release. The same design principles are applied to the disclosed concept to trap flames generated upstream of the filter. The induced swirl within the vortex generator followed by extreme turbulence between the front and rear walls of the filter and flame trap force oxygen to the surfaces of the burning particulates thereby completing in a few inches a burning process that otherwise would take several feet.

Thus, burning gases are harmlessly consumed in the confines of the filter. Combustible material issuing from the rear exit slots of the filter do so at velocities that are far beyond the flame propogation rate for gas-/air mixtures.

Although but one embodiment of the present invention has been shown and described, it will be apparent to those skilled in the art that various changes and modifications may be made therein without departing from the spirit of the invention or from the scope of the appended claims.

What is claimed is:

1. A grease extracting baffle and flame trap for mounting in the exhaust duct of a ventilating system of a cooking unit comprising:
    a plurality of baffles each formed to provide a substantially cylindrically shaped open ended pocket for receiving the grease laden gases for causing them to acquire a rotary and whirling movement about an annular axis in the pocket,
    means mounting said baffles so that a first opening to each of said pockets arranged along their lengths is arranged with similar openings of the other pockets in a coplanar arrangement said mounting means including walls spaced from and transverse said open ended ends,
    said means being angularly positionable in the ventilating system of a cooking unit so that the first openings to said pockets receive the grease laden gases being vented to atmosphere, and
    a second opening for each of said pockets in the lower portion of said mounting means,
    said second opening being arranged laterally of the rotary and whirling movement of the gases in that pocket for exhausting the gases from that pocket downstream of said baffles,
    said second opening in each pocket being positioned along the annular axis of the rotary and whirling movement of the gases in that pocket,
    said means for mounting said baffles comprising a plate provided with a plurality of openings for receiving and aligning one baffle in each of said openings,
    each of said baffles being formed from a thin sheet of metal having its ends bent over to form flanges,
    said baffles being formed in an arcuate configuration which extends through different openings in said plate with its end flanges overlapping parallel edges of the opening in which it is positioned whereby the arcuate configuration of said baffles form said pockets.

2. The grease extracting baffle and flame trap set forth in claim 1 wherein:
    each of said baffles is formed from a rectangular piece of metal with the flanges formed thereon at its narrow ends and the first opening of each baffle formed along the baffle's longitudinal axis.

3. The grease extracting baffle and flame trap set forth in claim 1 in further combination with:

an exhaust opening formed in a back of a box-like frame positioned approximately mid-way between its sides.

4. The grease extracting baffle and flame trap set forth in claim 3 wherein:

openings in a face plate are arranged in coplanar rows.

* * * * *